United States Patent [19]

Thiem et al.

[11] 3,907,838

[45] Sept. 23, 1975

[54] PROCESS FOR THE PREPARATION OF PURE 1-AMINO ANTHRAQUINONE

[75] Inventors: Karl-Werner Thiem, Cologne; Wolfgang Auge, Odenthal; Rutger Neeff, Leverkusen, all of Germany

[73] Assignee: Bayer Aktiengesellschaft, Leverkusen, Germany

[22] Filed: Aug. 22, 1974

[21] Appl. No.: 499,733

[30] Foreign Application Priority Data

Aug. 31, 1973 Germany.............................. 2343977

[52] U.S. Cl. ................................................. 260/378
[51] Int. Cl.² ........................................ C07C 97/24
[58] Field of Search .................................. 260/378

[56] References Cited
UNITED STATES PATENTS

| | | | |
|---|---|---|---|
| 1,980,162 | 11/1934 | Bayer.................................. | 260/378 |
| 2,183,652 | 12/1939 | Lord et al........................... | 260/378 |
| 2,874,168 | 2/1959 | Graham et al. ................. | 260/378 X |

FOREIGN PATENTS OR APPLICATIONS

| | | | |
|---|---|---|---|
| 647,325 | 12/1950 | United Kingdom................. | 260/378 |
| 705,919 | 3/1954 | United Kingdom................. | 260/378 |
| 781,258 | 8/1957 | United Kingdom................. | 260/378 |
| 1,085,063 | 9/1967 | United Kingdom................. | 260/378 |

*Primary Examiner*—Allen B. Curtis
*Attorney, Agent, or Firm*—Burgess, Dinklage & Sprung

[57] ABSTRACT

A 1-amino anthraquinone substantially free of diamino anthraquinone is prepared as follows:
1. Nitrating anthraquinone or a mixture which contains anthraquinone with concentrated nitric acid at a temperature of at least −20°C, the mole ratio of nitric acid to anthraquinone being at least 4:1;
2. Stopping the reaction when the anthraquinone conversion is at least 50% by cooling the reaction mixture to below 30°C and/or by adjusting the mole fraction of nitric acid to a value of 0.86 or less;
3. Precipitating 1-nitroanthraquinone by adjusting the mole ratio of nitric acid to a value of from 0.7 to 0.4 and/or by cooling the reaction mixture to a temperature of below 20°C;
4. Converting the precipitated 1-nitroanthraquinone into the corresponding 1-aminoanthraquinone; and
5. Subjecting the reaction product to vacuum distillation.

28 Claims, No Drawings

PROCESS FOR THE PREPARATION OF PURE 1-AMINO ANTHRAQUINONE

BACKGROUND

This invention relates to a process for preparing 1-amino anthraquinone substantially free from diamino anthraquinone.

Methods for the preparation of 1-aminoanthraquinone by nitration of anthraquinone followed by reduction of the resulting 1-nitroanthraquinone have frequently been described in recent years. However, except in the mercury-catalysed preparation of anthraquinone-1-sulphonic acid, substantial quantities of by-products are formed (2-nitroanthraquinone, 1,5- 1,8- 1,6- and 1,7-dinitroanthraquinone) in addition to the desired 1-nitroanthraquinone Since these by-products also undergo reaction when 1-nitroanthraquinone is worked up into dyes by a multi-stage process, the quality of the dyes is very badly affected by the resulting secondary products, as has already been reported in German Offenlegungsschrift No. 2 162 538.

There has therefore been no lack of attempts to produce 1-nitroanthraquinone, in a sufficiently pure form for the preparation of anthraquinone dyes, from the nitroanthraquinone mixtures resulting from the nitration of anthraquinone (e.g., by reaction in concentrated nitric acid or with nitric acid in sulphuric acid, hydrofluoric acid or phosphoric acid by employing special methods of purification.

Thus for example, a process for nitrating anthraquinone in sulphuric acid with nitric acid has been disclosed in German Offenlegungsschrift No. 2 039 822. Even when this process is carried out under the best possible conditions, the crude product must be purified by washing with acid amides, e.g., dimethylformamide. 1-Nitroanthraquinone which is only 95–96% pure is obtained in a yield of 42%. All percentages herein are by weight unless otherwise stated.

German Offenlegungsschrift No. 2 103 360 discloses a process for the preparation of 1-nitroanthraquinone in phosphoric acid and nitric acid, in which part of the impurities remains in the phosphoric acid. 1-Nitroanthraquinone, which is at best about 96% pure, is obtained in a 43% yield by this process.

A variation of this process is described in German Offenlegungsschrift No. 2 142 100, in which the nitration product is purified by treatment with halogenated hydrocarbons, for example dichloroethane. The yield of 1-nitroanthraquinone can thereby be increased to 49% (of the theoretical amount). The purity, however, does not rise above 92%.

German Offenlegungsschriften Nos. 2 162 538, 2 227 340 and 2 220 377 describe the nitration of anthraquinone in nitric acid with concentrations above 90% in which the molar ratio of nitric acid to anthraquinone is at least 20:1. Part of the resulting by-products and unreacted anthraquinone can be removed by diluting the acid with dilute nitric acid, with the result that 1-nitroanthraquinone can be obtained in a yield of up to 74.5%, but its purity is not greater than 92%.

A serious disadvantage, particularly of the last-mentioned process, is that large volumes of nitric acid must be employed for nitration and for the subsequent purification process, and a pure product is not obtained.

There have also been attempts to obtain a purer product by purifying crude 1-nitroanthraquinone by repeated crystallisation (Zeitschrift fur Elektrochemie 7, 797 (1901)). It has also been disclosed in Chem. and Ind. 41, 1070 (1953) that separation of the products can be achieved by dissolving them in concentrated sulphuric acid and fractionally precipitating the nitration products by gradually diluting the acid with water. Furthermore, U.S. Pat. No. 2 302 729 and German Offenlegungsschrift No. 2 206 960 describe processes in which crude or partly purified nitration products of anthraquinone can be further purified by boiling with aqueous alkali metal sulphite solution. The degree of purity of the 1-nitroanthraquinone obtained by this process is between 87 and 97%.

The impurities which have not been removed consist substantially of anthraquinone and dinitroanthraquinone.

Purification with alkali metal sulphites has, however, serious disadvantages since part of the nitration products, including part of the 1-nitroanthraquinone, is converted into water-soluble products of undefined composition which, together with the inorganic salts, heavily contaminate the effluent water. Since no process has so far been developed to recover a technically utilizable product from the filtrates of sulphite purification, this process has the added disadvantage of entailing a loss of anthraquinone derivatives.

All the methods described above succeed in removing 2-nitroanthraquinone, 1,6- and 1,7-dinitroanthraquinone and unreacted anthraquinone almost completely.

The resulting "purified" 1-nitroanthraquinone, however, is still contaminated to a substantial degree with 1,5- and 1,8-dinitroanthraquinone, so that in most cases it cannot be processed into dyes without further separation steps.

Since 1-aminoanthraquinone is used as starting material for by far the majority of anthraquinone dyes, a further process is required to convert 1-nitroanthraquinone into 1-aminoanthraquinone.

Conversion of 1-nitroanthraquinone into 1-aminoanthraquinone can be carried out in various ways, for example by reduction with aqueous sodium sulphide solution, although the inorganic salts and strongly coloured organic substances dissolved in the filtrates heavily contaminate the effluent water.

Most of the processes described, which succeed in converting 1-nitroanthraquinone into 1-aminoanthraquinone, pose similar ecological problems or else give rise to so many by-products that the purity and yield of 1-aminoanthraquinone are greatly impaired. Thus, for example, German Offenlegungsschrift No. 2 211 411 describes a process for the preparation of aminoanthraquinones in which aminoanthraquinones are obtained from nitroanthraquinones by reaction with ammonia, ammonium salts or amides in the presence of an amide which is liquid under the reaction conditions. The reaction is carried out at an elevated temperature, preferably between 100° and 180°C, optionally under pressure. The amides used are low molecular weight organic amides, e.g., formamide, urea or N-methylpyrrolidone.

The reaction mixture is worked up by conventional methods, e.g., distilling off the amide, precipitating the aminoanthraquinone with water or extraction.

If the conditions described in the above-mentioned Offenlegungsschrift are observed, however, it is found that under the given reaction conditions anthraquinone is formed in addition to the undesirable by-products. The yield of 1-aminoanthraquinone is relatively low.

It has now surprisingly been found that very pure 1-aminoanthraquinone, which is almost free from diaminoanthraquinone and which can be used directly for the production of dye intermediates, can be prepared in good yields if anthraquinone, or a mixture which contains anthraquinone, is nitrated in concentrated nitric acid, in particular in at least 90% and preferably 95 to 100% nitric acid, with a molar ratio of nitric acid to anthraquinone of at least 4:1, in particular 6:1 – 15:1; the reaction is stopped when 50% or more, in particular from 80 to 100%, of the anthraquinone has been converted, by cooling the reaction mixture to temperatures of 30° or less and/or by reducing the molar fraction of nitric acid, e.g. by adding water and/or distilling off nitric acid; 1-nitroanthraquinone is then precipitated, optionally by further cooling the reaction mixture and/or by further reducing the mole fraction of nitric acid, e.g., by adding water and/or dilute nitric acid, in particular at most 90% nitric acid and/or distilling off nitric acid; the precipitate is isolated; and when the resulting nitroanthraquinone has been converted to the corresponding aminoanthraquinone, in particular by reacting it with ammonia, preferably at elevated temperature and under pressure, in ethers, aliphatic and cycloaliphatic or optionally alkyl-substituted aromatic hydrocarbons, or in mixtures of these compounds, it is subjected to vacuum distillation.

In the following text, the term "mole fraction" is used to denote that fraction of nitric acid in the given total mixture which corresponds to the following equation:

$$\gamma_{HNO_3} = n_{HNO_3}/(n_{HNO_3} + n_N + n_{H_2O})$$

where $n$ = number of moles, and
$N$ = nitroanthraquinones and anthraquinone.

The term mole ratio in the preparation of 1-nitroanthraquinone means the ratio of nitric acid to anthraquinone respectively anthraquinone plus nitration products.

The process according to the invention is characterised in that anthraquinone, or a mixture which contains anthraquinone, is nitrated in concentrated nitric acid, in particular in at least 90% and preferably 95–100% nitric acid, at temperatures of −20°C or higher, in particular 45°C or higher, preferably 55–75°C, and with a molar ratio of nitric acid to anthraquinone of at least 4:1, in particular from 6:1 to 15:1; the reaction is stopped when 50% or more, in particular from 80 to 100% of the anthraquinone has been converted, by cooling the reaction mixture to below 30° and/or adjusting the molar fraction of nitric acid to a value of not more than 0.86 by adding water and/or distilling off nitric acid; thereafter the molar fraction of nitric acid is adjusted to a value of between 0.7 and 0.4, for example by distilling off nitric acid and/or diluting with water and/or adding dilute nitric acid, and/or the reaction mixture is cooled to temperatures below 20°C; the precipitated 1-nitroanthraquinone is then separated off and converted into the corresponding 1-aminoanthraquinone, preferably by reacting 1-nitroanthraquinone at temperatures of from 100° to 250°C, preferably from 120° to 200°C, with ammonia, in particular with a mole ratio of amonia: nitroanthraquinones of at least 2:1, preferably from 5:1 to 40:1, and in particular from 10:1 to 35:1, and preferably at a pressure above 20 atmospheres, in particular above 50 atmospheres, in ethers, aliphatic or cycloaliphatic or optionally alkyl-substituted aromatic hydrocarbons, or in mixtures of these compounds; and the reaction product is then subjected to vacuum distillation, preferably vacuum rectification.

The term "mole ratio" in the preparation of 1-aminoanthraquinone means the ratio of ammonia to nitroanthraquinones based on the number of nitro groups which are to be reacted.

By mixtures which contain anthraquinone are meant mixtures which in addition to anthraquinone contain nitro derivatives of anthraquinone, for example 1-nitroanthraquinone, 2-nitroanthraquinone and dinitroanthraquinone.

The quantitative proportion of anthraquinone to nitro compounds of anthraquinone in such mixtures is not critical for the process according to the invention, although one would generally use mixtures which contain at least 50% by weight of anthraquinone.

Nitration according to the process of the invention can be carried out in conventional reaction apparatus such as flow tubes, tank cascades or tanks, either continuously or discontinuously. In order to obtain maximum yields of 1-nitroanthraquinone in continuous processes, the flow in a flow tube should be a pronounced plug flow and the Reynolds numbers should be at least 2,300, and in cascades or tanks an ideal spectrum of residence times should be achieved. The reaction is preferably carried out adiabatically or partly adiabatically but may, of course, also be carried out isothermally. The anthraquinone conversion should be between 80 and 100%.

For example, when nitration is carried out with mole ratios of nitric acid to anthraquinone of 6:1 to 19:1, e.g. with 99% nitric acid, mole fractions of $\gamma_{HNO_3}$ = 0.69 − 0.87 are obtained.

The point at which the reaction is stopped depends on the mole fraction of nitric acid in the mixture and, of course, also on the temperature. Lower mole fractions are required at higher temperatures than at low temperatures.

If, for example, nitration is carried out with a mole ratio of 19:1, 15:1, 10:1 or 6:1, the reaction may be stopped by cooling to temperatures of ⩽ −5°C, ⩽ 5°C, ⩽ 15°C, or ⩽ 30°C respectively. The corresponding mole fractions are $\gamma HNO_3$ = 0.871; 0.847; 0.793 and 0.694. The corresponding mole fractions may, of course, also be obtained by stopping the reaction by rapidly distilling off concentrated nitric acid. At higher temperatures, the mole fractions must of course, be adjusted to smaller values. Thus, for example at a temperature of 65°C (45°/25°), mole ratios of 18:1, 10:1 and 5:1, and acid concentrations of about 86% (90/93), 91.5% (93.5/95.5) and 95.5% (96.5/97.5), the mole fractions should be 0.615 (0.692/0.758), 0.702 (0.744/0.791) and 0.733 (0.754/0.775). These values can also be obtained, for example, by adding water to the reaction mixture to stop the reaction.

Like the process of stopping the reaction, the process of purification by crystallisation also depends on the temperature and the molar fraction of nitric acid in the nitration mixture. Since nitric acid has a relatively high vapour pressure at elevated temperatures, it would appear to be more suitable to filter off the crystallisate at room temperature or temperatures up to 30°C. The quantities and concentrations of nitric acid required for purification depend on which impurities are required to be removed and in what quantities. If, for example, 10% by weight (or 5% by weight) of anthraquinone is required to be removed from the nitroanthraquinone mixture, then the acid concentrations may be adjusted, e.g., to about 93% (82%), 84% (78%), 80% (76%) or 76% (72%) and the mole fractions to corresponding values of $\gamma = 0.69$ (0.53), 0.58 (0.49), 0.52 (0.47) or 0.46 (0.42).

The same also applies, of course, to the separation of 2-nitroanthraquinone from nitroanthraquinone mixtures. Thus, for example, if about 8% by weight of 2-nitroanthraquinone and less than 3% by weight of anthraquinone are to be removed, the acid concentrations should be adjusted, for example to about 80%, 78%, 76% or 72% and the mole fractions correspondingly to $\gamma = 0.51; 0.49; 0.47$ or $0.42$.

In order to reduce the loss of 1-nitroanthraquinone by separation to a minimum, the molar fractions should be adjusted to high (low) values when the acid concentrations are high (low), i.e., the molar ratios should be low (high).

The separation loss of 1-nitro-anthraquinone is smaller the greater the quantity of dilute nitric acid. However, it is uneconomical to use large quantities of dilute nitric acid, since the nitric acid must then be distilled and possibly reconcentrated. It has now been found that 1-nitroanthraquinone sufficiently pure for the next stage of the process is obtained by using 90 to 72% nitric acid for crystallisation and purification and adjusting the mole fractions accordingly to values of between $\gamma = 0.70$ and $\gamma = 0.42$.

The following possible combinations are then available for stopping the reaction and subsequent purification by the process according to the invention:

If the reaction is stopped by the addition of a small quantity of water and/or by distilling off nitric acid and/or by cooling the reaction mixture, the molar fraction required for precipitation of 1-nitroanthraquinone can be adjusted by the addition of water and/or dilute nitric acid and/or by distilling off nitric acid.

If a molar ratio of nitration product and unreacted anthraquinone to nitric acid of not more than 12:1 is obtained by distillation, or if nitration is carried out at these molar ratios, then 1-nitroanthraquinone precipitated at temperatures of up to 15°C can be separated from the by-products in the filtrate. These by-products can be precipitated almost completely from the filtrate if the mole fraction is adjusted to a value of not more than 0.4, e.g., by dilution with water or partial or complete removal of nitric acid by distillation. This mixture of by-products which is precipitated and removed in the usual manner contains practically all the 2-nitroanthraquinone.

This can be isolated in a relatively pure form if the precipitation described above is carried out in fractions. Nitric acid freed from the organic products can be returned to the process either as dilute acid or after it has been reconcentrated.

The 1-nitroanthraquinone which has been precipitated from the nitric acid and which generally contains only 1,5- and 1,8-dinitroanthraquinone is obtained in a crystalline form and can be filtered off relatively easily (e.g., by means of a rotary filter, plane filter or pressure filter). The filter cake may be washed until neutral with water or ammoniacal water in the usual manner, after it has been briefly washed with dilute nitric acid, or it may be reacted, e.g., with ammonia, to form 1-aminoanthraquinone while it is still acidic as a result of the nitric acid.

Under the conditions according to the invention, the reaction with ammonia is preferably carried out under pressure. The reaction time depends on the temperature, the pressure and the mole ratio, the reaction velocity rising with the temperature, the mole ratio and the pressure. If, for example, a pressure of from 50 to 70 atmospheres is employed when the mole ratio is 10:1 and the temperature is 200°C (150°C or 130°C), then the reaction is complete after about 0.5 hours (2 hours or 4 hours). On the other hand, if the mole ratio is 50:1 and the temperature is 100° (30:1 at 130° or 20:1 at 150°) for example, the reaction time would be expected to be less than 6 hours (less than 5 or less than 2 hours). Suitable solvents for this reaction are particularly ether, aliphatic or cycloaliphatic or optionally alkyl-substituted aromatic hydrocarbons, or mixtures of these compounds.

Suitable ethers are, in particular, aliphatic, cycloaliphatic and aromatic ethers such as dibenzyl ether, di-sec.-butyl ether, diisopentylether, ethylene glycol dimethylether, diethyleneglycol dimethylether, diethyleneglycol diethylether, methoxycyclohexane, ethoxycyclohexane, dicyclohexylether, anisole, phenetole, diphenylether, 2-methoxynaphthalene, tetrahydrofuran, diglycol-di-n-butylether, glycol methylene ether and methyl benzyl ether.

Suitable aliphatic and cycloaliphatic hydrocarbons are, for example, n-pentane, n-hexane, n-heptane, cyclohexane, methylcyclohexane, cyclododecane, decalin, cycloheptane, cyclopentane, n-decane, 1,2-dimethylcyclohexane, 1,3-dimethylcyclohexane, 1,4-dimethylcyclohexane, 2,2-dimethylpentane, 2,3-dimethylpentane, 2,4-dimethylpentane, 3,3-dimethylpentane, isopropylhexane, methylcyclohexane, 2-methylheptane, 3-methylheptane, 4-methylheptane, 2-methylhexane, 3-methylhexane, 2-methyloctane, 3-methyloctane, 4-methyloctane, 2-methylpentane, 3-methylpentane, n-octane, pentaisobutane, triethylmethane, 2,2,3E-trimethylpentane, 2,2,4-trimethylpentane and 2,3,3-trimethylpentane.

Suitable aromatic hydrocarbons are, for example, benzene, toluene, o-, m- and p-xylene, isopropylbenzene, trimethylbenzene, diethylbenzene, tetramethylbenzene, di-isopropylbenzene, isododecylbenzene, tetraline, naphthalene, methylnaphthalene, diphenyl, diphenylmethane, o-, m- and p-cymene, dibenzyl, dihydronaphthalene, 2,2'-dimethyl-diphenyl, 2,3'-dimethyl-diphenyl, 2,4'-dimethyl-diphenyl, 3,3'-dimethyldiphenyl, 1,2-dimethylnaphthalene, 1,4-dimethylnaphthalene, 1,6-dimethylnaphthalene, 1,7-dimethylnaphthalene, 1,1-diphenylethane, hexamethylbenzene, isoamylbenzene, pentamethylbenzene, 1,2,3,4-tetramethylbenzene, 1,2,3,5-tetramethylbenzene, 1,2,7-trimethylnaphthalene and 1,2,5-trimethylnaphthalene.

The reaction mixture may be worked up by conventional methods, for example by filtering off the product which crystallises from the organic solvent on cooling to room temperature. The resulting mother liquor can be returned to the reaction mixture.

The reaction mixture may also be worked up by distilling off the solvent or by precipitating 1-aminoanthraquinone by adding a diluent which reduces the solubility of the 1-aminoanthraquinone in the reaction mixture (e.g., petroleum ether).

Since 1,5- and 1,8-dinitroanthraquinones which are not completely removed by the crystallisation process are converted into the corresponding diaminoanthraquinones, e.g., by reaction with ammonia, the 1-aminoanthraquinone obtained may be melted and subjected to vacuum distillation, in particular vacuum rectification, if indicated, after first removing any solvent adhering to it.

Distillation may be carried out at a temperature of from 200° to 400°C and 1–500 Torr, preferably 230°–350°C and 2–150 Torr, in particular at 250°–330°C and 6–90 Torr. It was found particularly advantageous to carry out distillation at temperatures of between 260° and 310°C, under a vacuum of 8–50 Torr.

According to a particular variation of the process, the product is distilled off under the given conditions, in particular at 200° to 400°C and 1–500 Torr, together with a solvent which boils at 100°–400°C, which is stable under the conditions of distillation, and which is inert towards the product, e.g., high boiling hydrocarbons, paraffins or silicone oils. 1-Aminoanthraquinone which crystallizes from the condensate is removed by conventional methods.

The process according to the invention may be carried out, for example, in the form of the following variations:

VARIATION 1

Nitration is stopped by introducing the whole reaction mixture into an evaporator, e.g., a thin layer contact evaporator or a falling film evaporator; distilling off the necessary portion of nitric acid, preferably rapidly; cooling the mixture in the sump in a crystallisation apparatus to temperatures of up to 15°C and/or precipitating 1-nitroanthraquinone by adding water or dilute nitric acid, and then removing it in a separating device. The by-products dissolved in the filtrate can be precipitated from the filtrate by dilution with water or by distilling off the nitric acid. The nitric acid freed from organic products can be separated into a high percentage nitric acid and a low percentage nitric acid in a conventional manner in a distillation column. The higher percentage portion may be returned to the nitration process and the low percentage portion to the crystallisation stage.

The precipitated 1-nitroanthraquinone may be freed from nitric acid, in particular by direct vacuum drying, and put into the reaction for conversion into 1-aminoanthraquinone (e.g. by reaction with ammonia under pressure)., either in the dehydrated form, or still moist with water, or still acidified with nitric acid. The 1-aminoanthraquinone obtained in this way is then vacuum rectified.

VARIATION 2

Nitration is stopped by cooling in a cooling apparatus to temperatures of at most 25°C, depending on the molar ratios. 1-Nitroanthraquinone is subsequently precipitated by diluting the reaction mixture with water and/or dilute nitric acid and/or by cooling the reaction mixture to at most 15°C, and the precipitated 1-nitroanthraquinone is removed in a separating device. It is then worked up and processed as described in Variation 1.

VARIATION 3

Nitration is stopped by the addition of a small quantity of water in a mixing vessel. The reaction mixture is then adjusted to a molar fraction of at most 0.7 by the addition of dilute nitric acid or further quantities of water and/or by distilling off the appropriate quantity of nitric acid. The precipitated 1-nitroanthraquinone is separated off.

1-Nitroanthraquinone is worked up and processed as described in Variation 1. Combinations of these variations may of course also be used.

The advantages of the process according to the invention lie in the fact that very pure and dry 1-aminoanthraquinone, which is practically free from diaminoanthraquinone and can easily be processed to dyes, is prepared in high yields by simple process steps which do not give rise to environmental problems.

In the following Examples, the molar ratio referred to is in the preparation of 1-nitroantrhaquinone that of nitric acid to anthraquinone respectively anthraquinone plus nitration products, and in the preparation of 1-aminoanthraquinone that of ammonia to nitroanthraquinone based on the number of nitro groups to be reacted. Unless otherwise indicated, the crystallised products are separated at room temperature. The yields are always based on the anthraquinone used and the degrees are °C. All the steps of the process can be carried out continuously. Any of the experiments described here which have been carried out discontinuously may equally well be carried out continuously, and vice versa.

EXAMPLE 1

A mixture of 2.08 kg of anthraquinone and 9.545 kg of 99 % nitric acid per hour (mole ratio 15:1) cooled to 0°C is continuously reacted, partly adibatically at temperatures of up to 55°C in a flow tube reactor with a residence time of 10 minutes. To stop the reaction, the reaction mixture is transferred to an evaporated (e.g. thin layer, circulating or falling film evaporator) immediately on leaving the reactor, and in this evaporator 4.725 kg of 99% nitric acid are distilled off very rapidly under vacuum ($\gamma_{HNO_3} = 0.740$). The nitric acid distilled off may be used again for nitration. The sump product is transferred to a crystallisation vessel into which 5.986 kg of 70% nitric acid flow per hour (crystallisation acid 80%, $\gamma_{HNO_3} = 0.519$). The crystallised product is separated with the aid of a centrifuge (e.g. also with the aid of a rotary, plane or pressure filter), and after it has been washed briefly with 75 % nitric acid, it is washed with aqueous ammonia. It is then continuously reacted with 2.851 kg of ammonia (mole ratio 20:1) and 20 l of xylene per hour at 150°C in a three stage stirrer-equipped autoclave (pressure ≥ 60 atmospheres) with a residence time of about 60 minutes. All the xylene is then distilled off, freed from water of reaction and returned to the process. The aminoanthraquinone is freed from the xylene adhering to it by treatment under vacuum, and is then subjected to continuous vacuum rectification at 30 Torr and 294° head temperature. The yield of 99% pure 1-aminoanthraquinone is 1.431 kg (63.5% of the theoretical amount).

EXAMPLE 2

208 g of anthraquinone are introduced at room temperature with stirring into 955 g of 99% nitric acid (mole ratio 15:1) without cooling. When the reaction mixture reaches a temperature of 55°C, the reaction is continued isothermally until the total reaction time if about 9 minutes. The reaction is then stopped by rapidly distilling off 376 g 99% nitric acid (95.5% nitric acid, $\gamma_{HNO_3} = 0.779$), and crystallisation is carried out by slowly adding 1147 g of 70% nitric acid (crystallisation acid 78.1%, $\gamma_{HNO_3} = 0.492$). The precipitated product is filtered off and, after brief washing with 75% nitric acid, it is reacted with 141 g of ammonia (mole ratio 10:1) and 1 l of xylene in an autoclave (20 to 30 atmospheres) for 6 hours at 150°C. The product is then filtered off, freed from the xylene adhering to it, and subjected to vacuum rectification at a head temperature of 285°C and 20 Torr. The xylene can immediately be used again.

144.4 of 98.9% pure 1-aminoanthraquinone are obtained (64.0% of the theoretical amount).

Similarly good yields are obtained when the following solvents are used instead of xylene: toluene, benzene, 1,3,5-trimethylbenzene, isopropylbenzene, isododecylbenzene, diphenylmethane, n-hexane, n-heptane, decaline, tetraline, methylcyclohexane, cyclododecane, n-dipropylether, dibutylether, diethyleneglycoldimethylether, diethylene-glycol-diethylether, methoxycyclohexane, dicyclohexylether, anisole, phenetole, diphenylether, tetrahydrofuran, dioxane, or mixtures of these solvents.

EXAMPLE 3

208 g of anthraquinone are introduced into 1145 g of 99% nitric acid (mole ratio 18:1) at 25°C with cooling and stirred for 25 minutes. The reaction is then stopped by rapidly distilling off 693 g of 99% nitric acid and the product is precipitated by slowly cooling the reaction mixture to 0°C. After washing a small quantity of 70% nitric acid, the product is washed with water and the moist product is reacted with 682 g of ammonia (mole ratio 50:1) and 2 l of cyclohexane for 5 hours at 120°C in an autoclave (60 to 70 atmospheres). The cyclohexane is distilled off together with excess ammonia, while the 1-aminoanthraquinone is rectified under vacuum at 35 Torr and a head temperature of 298°C. 133.3 g of 98.3% pure 1-aminoanthraquinone (59.0% of the theoretical amount) are obtained.

EXAMPLE 4

208 g of anthraquinone and 509 g of 99% nitric acid (mole ratio 8:1) are heated to 60°C for one hour. The reaction mixture is then rapidly cooled to 0°C and 1584 g of 73% nitric acid are added (crystallisation acid 78%, $\gamma_{HNO_3} = 0.493$). The crystallised product is filtered off, freed from nitric acid under vacuum and reacted with 400 g of ammonia (mole ratio 30:1) and 1 l of ethylene glycoldimethylether in an autoclave (65 – 75 atmospheres) at 130°C for 5.5 hours. After cooling, the reaction mixture is introduced into water and the resulting precipitate is suction-filtered, dried and rectified at a head temperature of 265°C and 10 Torr. 131.8 g of 98.9 % pure 1-aminoanthraquinone are obtained as distillate (58.5% of the theoretical amount).

EXAMPLE 5

208 g of anthraquinone are heated to 35°C in 969 g of 97.5% nitric acid (mole ratio 15:1) for 2 hours with stirring. The reaction is stopped by the addition of 103 ml of water.

After removal of 265 g of 99% nitric acid (crystallisation acid 81%, $\gamma_{HNO_3} = 0.520$) by distillations, the precipated product is suction-filtered washed with a little 70% nitric acid and then with aqueous ammonia, dried and reacted with 2 l of mesitylene and 44 g of ammonia (mole ratio 3:1) at 180°C and 80 atmospheres for 4 hours. After removal of the solvent and excess ammonia, the 1-aminoanthraquinone is rectified at a head temperature of about 290°C and 25 Torr. Yield 131.5 g of 98.1% 1-aminoanthraquinone (58% of the theoretical amount).

EXAMPLE 6

208 g of anthraquinone are introduced into 955 g of 99% nitric acid (mole ratio 15 : 1) at 0°C with stirring. The temperature of the reaction mixture rises to 55°C in about 6 minutes. This temperature is maintained by cooling until the total reaction time is 10 minutes. 316 g of 99% nitric acid are then distilled off very rapidly at this temperature under vacuum ($\gamma_{HNO_3} = 0.791$). 100 ml of water are then slowly added to the sump product (crystallisation acid 82%, $\gamma_{HNO_3} = 0.532$). The precipitated product is suction-filtered, washed with a little 75% nitric acid and then with water, dried and reacted with 145 g of ammonia (mole ratio 10:1) in 1 l of xylene at 170°C and 70 to 80 atmospheres for 2 hours. When the product has been freed from solvent and excess ammonia, it is rectified at a head temperature of about 285°C and 20 Torr. Yield 143 g of a 98.1% 1-aminoanthraquinone (63% of the theoretical amount).

EXAMPLE 7

208 g of anthraquinone are introduced into 764 g of 99% nitric acid (mole ratio 12 : 1) with stirring. The reaction is continued adiabatically until the temperature reaches 45°C. It is then continued isothermally at 45°C until the total reaction time is 17 minutes. The reaction is stopped by distilling off 330 g of 99% nitric acid. 128 g of 50% nitric acid (crystallisation acid 83.4%, $\gamma_{HNO_3} = 0.542$) are slowly added to the sump product (acid concentration approximately 94.4%, $\gamma_{HNO_3} = 0.725$). The crystallized product is suction-filtered, washed with a little dilute nitric acid, freed from nitric acid under vacuum and reacted with 64 g of ammonia (molar ratio 5:1) in 1.2 l of xylene in an autoclave (70–80 atmospheres) at 220°C for 2 hours. After removal of the xylene and excess ammonia by distillation, the resulting 1-aminoanthraquinone is rectified at a head temperature of 305°C and 40 Torr. The yield of 98.4% pure 1-aminoanthraquinone is 134.0 g (59% of the theoretical amount).

EXAMPLE 8

208 g of anthraquinone are introduced into 1208 g of 99% nitric acid at 0°C with stirring (mole ratio 19:1). After a reaction time of 110 minutes at 0°C, the temperature is rapidly reduced to −20 °C to stop the reaction. 1797 g of 63.8% nitric acid (crystallisation acid 77%, $\gamma_{HNO_3} = 0.483$) are then added slowly to bring about crystallisation. The crystallised and filtered product is washed with a little 75% nitric acid, freed from nitric acid and reacted with 275 g of ammonia (mole ratio 20:1) in 1 l of xylene in an autoclave (30 to 40 atmospheres) at 130°C for 6 hours, freed from xylene and then distilled with 500 g of paraffin oil at 50 Torr and temperatures between 260°C and 310°C. The paraffin oil is separated off and 148 g of 98.8 % pure 1-aminoanthraquinone are obtained (65% of the theoretical amount).

EXAMPLE 9

A mixture of 208 g of anthraquinone and 382 g of 99% nitric acid (mole ratio 6:1) is heated to 75°C for 10 hours and then slowly cooled to −10°C ($\gamma_{HNO_3}$ = 0.695). The precipitated product is filtered off, washed first with a little 75% nitric acid and then with aqueous ammonia, and heated with 1 l of toluene and 350 g of ammonia (mole ratio approximately 30:1) at 130°C for 5.5 hours in an autoclave (50–60 atmospheres). The xylene and excess ammonia are then distilled off and the product obtained in this way is distilled over with 600 g of silicone oil at 40 Torr and a head temperature of between 270° and 300°C. The product precipitated in the condensate is filtered off and freed from silicone oil. 127.2 g of 98.2% pure 1-aminoanthraquinone are obtained (56% of the theoretical amount).

EXAMPLE 10

208 g of anthraquinone are introduced into 99% of nitric acid which is at a temperature of 45°C (955 g, mole ratio 15:1). The isothermic reaction should be stopped after 9 minutes by rapid addition of 100 ml of water. Crystallisation is effected by slowly adding a further 105 ml of water (crystallisation acid 79%, $\gamma_{HNO_3}$ = 0.500). When the crystals have been separated off and washed with a little 75% nitric acid, they are stirred into 1 l of water and neutralised with sodium hydroxide solution. 1390 g of 20% sodium sulphide solution are stirred into the suspension over a period of 20 minutes. When the temperature has risen to 50°–60°C, the reaction mixture is slowly heated to 90°C and then stirred at this temperature for about 1 hour. The product is then filtered hot, washed with hot water, dried and rectified at a head temperature of 290°C and 25 Torr. 135.8 g of 98.5% pure 1-aminoanthraquinone are obtained (60% of the theoretical amount).

EXAMPLE 11

A mixture of 2.08 kg of anthraquinone and 9.545 kg of 99% nitric acid per hour (mole ratio 15:1) is cooled to 0°C and continuously reacted adiabatically to a final temperature of 55°C in a flow tube reactor, with a residence time of 13 minutes. The solution leaving the reactor is continuously cool to −10°C to stop the reaction and is introduced into a crystallisation apparatus together with 19.33 kg per hour of 66.2% nitric acid (crystallisation acid 76% $\gamma_{HNO_3}$ = 0.469).

The precipitated product is continuously suction-filtered, washed first with a little 76% nitric acid and then with aqueous ammonia, and continuously reacted as a suspension together with 20 l of xylene per hour with 2.09 kg of ammonia per hour (mole ratio 15:1) in a three-stage stirrer-equipped autoclave (40–50 atmospheres) at 170°C and with a residence time of 120 minutes. When cooled the reaction mixture is suction-filtered at room temperature freed from xylene and ammonia under vacuum (the mother liquor is used again after the addition of a small quantity of fresh xylene) and rectified at a head temperature of about 290°C at 25 Torr. 1.47 kg of 99.3% 1-aminoanthraquinone is obtained per hour (65.5% of the theoretical amount).

What is claimed is:

1. Process for preparing 1-aminoanthraquinone substantially free from diaminoanthraquinone which comprises:
   i. nitrating anthraquinone or a mixture which contains anthraquinone with concentrated nitric acid at a temperature of at least −20°C, the mole ratio of nitric acid to anthraquinone being at least 4 : 1;
   ii. stopping the reaction when the anthraquinone conversion is at least 50% by cooling the reaction mixture to below 30°C and/or by adjusting the mole fraction of nitric acid to a value of 0.86 or less;
   iii. precipitating 1-nitroanthraquinone by adjusting the mole ratio of nitric acid to a value of from 0.07 to 0.4 and/or by cooling the reaction mixture to a temperature of below 20°C;
   iv. converting the precipitated 1-nitroanthraquinone into the corresponding 1-aminoanthraquinone; and
   v. subjecting the reaction product to vacuum distillation.

2. Process of claim 1 wherein the anthraquinone is nitrated with at least 90% nitric acid.

3. Process of claim 1 wherein the nitration is stopped in step (ii) when the anthraquinone conversion is from 80 to 100%.

4. Process of claim 1 wherein the 1-nitroanthraquinone is converted in step (iv) to 1-aminoanthraquinone by reaction with ammonia in an ether, an aliphatic cycloaliphatic or optionally alkyl-substituted aromatic hydrocarbon, or in a mixture thereof.

5. Process of claim 1 wherein nitration is carried out in 95–100% nitric acid.

6. Process of claim 1 wherein nitration is carried out with a mole ratio of nitric acid to anthraquinone of from 6 : 1 to 15 : 1.

7. Process of claim 1 wherein nitration is carried out at a temperature of above 45°C.

8. Process of claim 1 wherein nitration is carried out at a temperature of from 55° to 75°C.

9. Process of claim 1 wherein the reduction of the mole fraction of nitric acid to terminate nitration is carried out by distilling off nitric acid.

10. Process of claim 1 wherein reduction of the mole fraction of nitric acid to terminate nitration is carried out by the addition of water.

11. Process of claim 1 wherein the reduction of the nitric acid mole fraction to terminate nitration is carried out by adding water and/or by distilling off nitric acid and/or by lowering the temperature in any sequence.

12. Process of claim 1 wherein reduction of the mole fraction of nitric acid to precipitate 1-nitroanthraquinone is carried out by distilling off nitric acid.

13. Process of claim 1 wherein reduction of the mole fraction of nitric acid to precipitate 1-nitroanthraquinone is carried out by adding water.

14. Process of claim 1 wherein reduction of the mole fraction of nitric acid to precipitate 1-nitroanthraquinone is carried out by adding dilute nitric acid.

15. Process of claim 1 wherein reduction of the mole fraction of nitric acid is carried out by adding dilute nitric acid and/or by adding water and/or by distilling off nitric acid and/or by lowering the temperature in any sequence.

16. Process of claim 1 wherein the precipitated 1-nitroanthraquinone is converted into 1-aminoanthraquinone with ammonia using a mole ratio of ammonia to nitroanthraquinone of at least 2 : 1.

17. Process of claim 16 wherein the reaction with ammonia is carried out with a mole ratio of from 5 : 1 to 40 : 1.

18. Process of claim 16 wherein the reaction with ammonia is carried out with a mole ratio of from 10 : 1 to 35 : 1.

19. Process of claim 16 wherein the reaction with ammonia is carried out at a temperature of from 100° to 250°C.

20. Process of claim 19 wherein the temperature is from 120° to 200°C.

21. Process of claim 16 wherein the reaction with ammonia is carried out under pressure.

22. Process of claim 21 wherein the pressure is at least 20 atmospheres.

23. Process of claim 21 wherein the pressure is at least 50 atmospheres.

24. Process of claim 1 wherein the reaction product is rectified together with at least one solvent which is inert under the conditions of rectification, and the crystallised 1-aminoanthraquinone is removed from the condensate.

25. Process of claim 24 wherein the solvent boils at a temperature of from 100° to 400°C and rectification is carried out at temperatures of from 200° to 400°C and pressures of 1–500 Torr.

26. Process of claim 24 wherein the solvent is a hydrocarbon.

27. Process of claim 26 wherein the solvent is a paraffin.

28. Process of claim 24 wherein the solvent is a silicone oil.

* * * * *